US 8,659,231 B2

(12) United States Patent
Busse et al.

(10) Patent No.: US 8,659,231 B2
(45) Date of Patent: Feb. 25, 2014

(54) ELECTRONIC BALLAST AND METHOD FOR OPERATION OF AT LEAST ONE DISCHARGE LAMP

(75) Inventors: Olaf Busse, Munich (DE); Siegfried Mayer, Moosinning (DE)

(73) Assignee: Osram AG, Munich (DE)

( * ) Notice: Subject to any disclaimer, the term of this patent is extended or adjusted under 35 U.S.C. 154(b) by 72 days.

(21) Appl. No.: 13/212,226

(22) Filed: Aug. 18, 2011

(65) Prior Publication Data

US 2012/0043898 A1 Feb. 23, 2012

(30) Foreign Application Priority Data

Aug. 18, 2010 (DE) .................. 10 2010 039 430

(51) Int. Cl.
| H05B 37/02 | (2006.01) |
| H05B 39/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/14 | (2006.01) |
| H05B 41/16 | (2006.01) |
| H05B 41/24 | (2006.01) |
| G05F 1/00  | (2006.01) |
| H01J 13/48 | (2006.01) |
| H01J 15/04 | (2006.01) |
| H01J 17/36 | (2006.01) |

(52) U.S. Cl.
USPC .................. 315/209 R; 315/200 R; 315/247; 315/291; 315/326

(58) Field of Classification Search
None
See application file for complete search history.

(56) References Cited

U.S. PATENT DOCUMENTS

| 5,623,187 A | 4/1997 | Caldeira et al. |
| 6,316,886 B1 * | 11/2001 | Luger et al. ................... 315/307 |
| 6,828,737 B2 * | 12/2004 | Busse et al. ................... 315/224 |
| 7,170,237 B2 | 1/2007 | Suzuki et al. |
| 2003/0076053 A1 | 4/2003 | Kambara et al. |
| 2005/0218824 A1 * | 10/2005 | Busse ........................ 315/200 R |
| 2009/0278468 A1 * | 11/2009 | Bonigk ......................... 315/287 |

FOREIGN PATENT DOCUMENTS

| DE | 10045712 A1 | 10/2003 |
| DE | 102009020884 A1 | 1/2010 |
| EP | 0596740 B1 | 3/1997 |
| EP | 1189490 B1 | 3/2002 |
| EP | 1624733 A2 | 2/2006 |
| WO | 02098187 A1 | 12/2002 |

OTHER PUBLICATIONS

English language abstract for DE 100 457 12 A1.
English language abstract for DE 10 2009 020 884 A1.
English language abstract for EP 1 189 490 B1.

* cited by examiner

*Primary Examiner* — Douglas W Owens
*Assistant Examiner* — Dedei K Hammond

(57) ABSTRACT

Various embodiments provide an electronic ballast for operation of at least one discharge lamp, with the electronic ballast having an apparatus for power factor correction with a voltage converter. The voltage converter itself includes an inductance, a diode and a switch. A control apparatus, which produces a square-wave signal as a control signal to the switch of the apparatus for power factor correction, includes an I regulator. This produces a first component of the on time of the control signal. In order to react to short-term power demands in the load circuit for example on ignition of the discharge lamp, an electronic ballast furthermore may include a power determining apparatus, which is coupled to the control apparatus, with the control apparatus being designed to vary the control signal as a function of the power consumed in the discharge lamp.

11 Claims, 2 Drawing Sheets

ELECTRONIC BALLAST AND METHOD FOR OPERATION OF AT LEAST ONE DISCHARGE LAMP

CROSS-REFERENCE TO RELATED APPLICATION

This application claims priority to German Patent Application Serial No. 10 2010 039 430.0, which was filed Aug. 18, 2010, and is incorporated herein by reference in its entirety.

TECHNICAL FIELD

Various embodiments relate generally to an electronic ballast and a method for operation of at least one discharge lamp.

BACKGROUND

By way of example, electronic ballasts known from the prior art use a boost converter as a voltage converter for the apparatus for power factor correction (PFC). In this case, reasonably constant intermediate-circuit voltages can be produced with the aid of a slow I regulator. In this case, the time constant of the I regulator must be long in order to obtain PFC characteristics of the voltage converter, that is to say to allow a sinusoidal current to be drawn. In the event of sudden load changes, for example on those which occur on ignition and the subsequent operation of the discharge lamp, the intermediate-circuit voltage must first of all drop considerably before the I regulator can react. The slow I characteristic of the regulator furthermore produces a further time delay before the closed-loop control system starts to operate. During the process, the intermediate-circuit voltage falls to an undesirably great extent. In the case of load circuits designed on the basis of limit values, this then leads to undesirable operating points. This can result in the discharge lamp not igniting, or in the electronic ballast switching off.

In order to prevent this, appropriate reserves are incorporated in the load circuit in the prior art. The load circuit in the prior art must therefore be designed such that it can produce an adequate power, for example for ignition of the lamp, even at relatively low intermediate-circuit voltages. For this purpose, by way of example, the capacitor at the output of the voltage converter is designed to be large, as is the lamp inductor. These measures allow more reactive current to be produced, to still allow ignition of the discharge lamp even when the intermediate-circuit voltage is low. The high reactive current which flows in this case results in undesirably high losses. The efficiency of an electronic ballast such as this is undesirably low, because of this.

WO 02/098187 A1 and EP 0 596 740 A1 disclose circuit arrangements for closed-loop control of the lamp power, for example in order to take account of ageing of the discharge lamp.

SUMMARY

Various embodiments provide an electronic ballast for operation of at least one discharge lamp, with the electronic ballast having an apparatus for power factor correction with a voltage converter. The voltage converter itself includes an inductance, a diode and a switch. A control apparatus, which produces a square-wave signal as a control signal to the switch of the apparatus for power factor correction, includes an I regulator. This produces a first component of the on time of the control signal. In order to react to short-term power demands in the load circuit for example on ignition of the discharge lamp, an electronic ballast furthermore may include a power determining apparatus, which is coupled to the control apparatus, with the control apparatus being designed to vary the control signal as a function of the power consumed in the discharge lamp.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
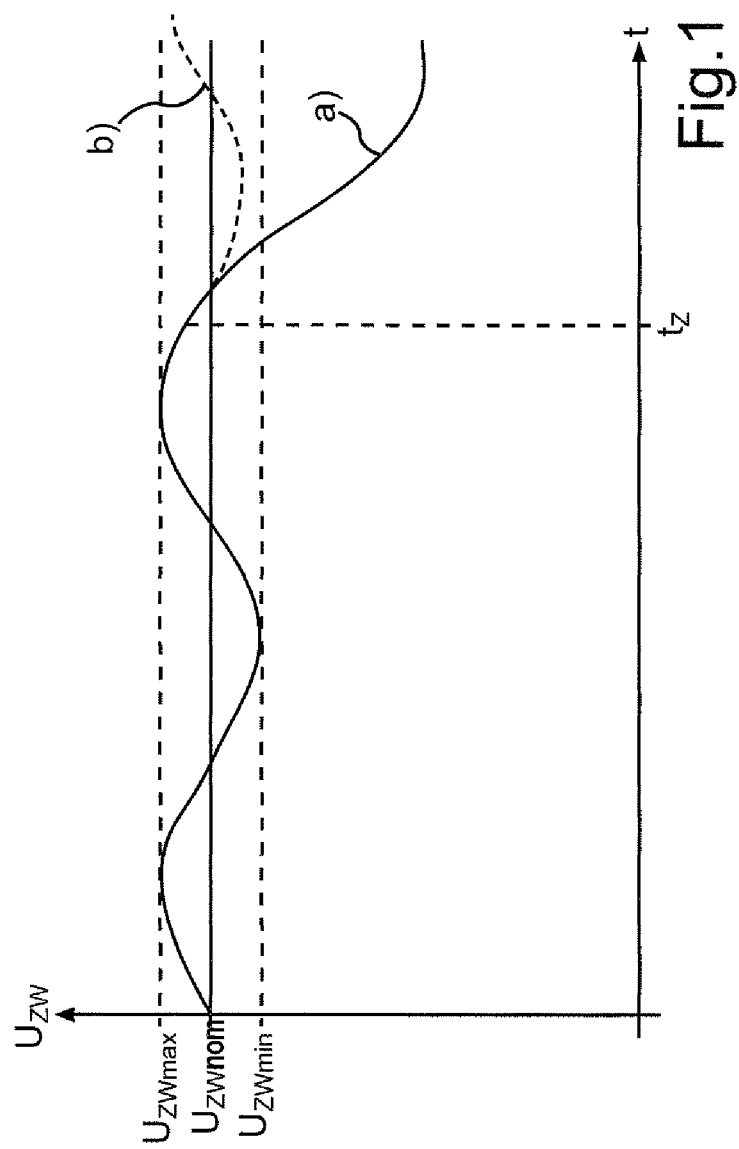
FIG. 1 shows a schematic illustration of the time profile of the intermediate-circuit voltage without (curve train a)) and with closed-loop control by an electronic ballast according to the invention (curve train b))

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide an electronic ballast for operation of at least one discharge lamp having an input having a first input connection and a second input connection for coupling to an AC supply voltage; a rectifier having an input and an output, with the input of the rectifier being coupled to the first input connection and the second input connection; an apparatus for power factor correction having an input and an output, with the input of the apparatus for power factor correction being coupled to the output of the rectifier, and with the apparatus for power factor correction including a voltage converter having an inductance, a diode and a switch in which case an intermediate-circuit voltage can be produced at the output of the apparatus for power factor correction during operation of the electronic ballast; a load circuit having a first output connection and a second output connection for coupling to the at least one discharge lamp, with the load circuit being coupled to the output of the apparatus for power factor correction; and a control apparatus having an I regulator with a nominal value input and an actual value input, with the nominal value input being coupled to a nominal-value production apparatus for production of a variable which is correlated with the nominal value of the intermediate-circuit voltage, with the actual value input being coupled to a node of the load circuit for production of a variable which is correlated with the actual value of the intermediate-circuit voltage, with the control apparatus being designed to produce at its output a control signal to the switch of the voltage converter, with the control signal being a square-wave signal, with the controlled variable of the I regulator representing a first component of the on time of the control signal, with the on time representing the time duration within one period of the square-wave signal, within which the switch in the voltage converter is switched on. It also relates to a corresponding method for operation of at least one discharge lamp.

Various embodiments develop an electronic ballast of this generic type and a method of this generic type so as to allow an efficiency which is as high as possible.

Various embodiments are based on the discovery that the above object can be achieved by varying the control signal for the switch of the voltage converter as a function of the power consumed in the discharge lamp. In this case, the power which is consumed in the discharge lamp is interpreted as a disturbance variable and is supplied as a manipulated variable to the apparatus for power factor correction. This allows reaction to certain load changes even before the intermediate-circuit voltage collapses. Various embodiments may be particularly advantageous in that, in modern microcontrollers which can be used as a control apparatus, the power in the output circuit is measured frequently in any case, for closed-loop control purposes. An appropriate measured value is therefore frequently already available, as a result of which the additional complexity for implementation of various embodiments can be kept low.

The time constant which governs the reduction in the intermediate-circuit voltage is defined by the capacitance of the capacitor at the output of the voltage converter, and by the resistance in the load circuit. This is normally between 2 ms and 10 ms. The time constant which governs the variation of the control signal with respect to the power consumed in the lamp is, in contrast about 400 µs and 1 ms in the present case. The reduction in the intermediate-circuit voltage can therefore be countered in good time. Intermediate-circuit voltage collapses can be reliably prevented. This allows the electrolytic capacitor and the lamp inductor to be designed to be comparatively small, thus resulting in lower losses than in the prior art. The efficiency of an electronic ballast according to various embodiments is therefore considerably higher than the efficiency of the conventional process mentioned above.

In various embodiments, the control apparatus is designed to produce a second component of the on time of the control signal as a function of the power consumed in the discharge lamp. In addition to the first component, which originates from the I regulator, a second component is accordingly added as a function of the power consumed in the discharge lamp. This may allow longer switched-on times to be achieved very quickly for the switch in the voltage regulator, thus allowing particularly rapid recharging of the capacitor at the output of the voltage converter. This makes it possible to reliably prevent an undesirable fall in the intermediate-circuit voltage. After the end of the increased power demand, the second component of the on time is correspondingly reduced again.

In various embodiments, the control apparatus can be designed to likewise increase the second component of the on time when an increase is found in the power consumed in the at least one discharge lamp. This makes it possible to react quickly to short-term power demands in the load circuit.

The time constant of the I regulator may be greater, e.g. by a multiple, than the time constant of the variation as a function of the power consumed in the at least one discharge lamp. This allows the I regulator to provide the comparatively slow recharging of the capacitor at the output of the voltage converter as desired in order to achieve power factor correction, while the closed-loop control system can react to the rapid power demands, for example on ignition of the discharge lamp, as a function of the power consumed in the at least one discharge lamp.

In various embodiments, a P regulator may be connected in parallel with the I regulator. In this case, the P regulator may produce a third component of the on time of the control signal. This may allow the closed-loop control to be provided by means of the I regulator and the P regulator during normal operation, that is to say when there is no extraordinary power demand in the load circuit. A P regulator can, of course, react more quickly to variations in the intermediate-circuit voltage than an I regulator.

A particularly suitable design of the P regulator in this case makes it possible to ensure that no infringement of the PFC condition occurs. In this context, it may therefore be provided for the transfer function of the P regulator, which reflects the relationship between the third component of the on time and a change in the intermediate-circuit voltage, to have a flat center section in the area of the zero crossing, that is to say of the nominal value of the intermediate-circuit voltage. This flat center section makes it possible to ensure that the 100 Hz ripple (when the AC supply voltage is at a frequency of 50 Hz) does not to lead to departure from the PFC condition during normal operation. The P regulator accordingly reacts only to changes which would lead to departure from the intermediate-circuit voltage window predetermined by the 100 Hz ripple. The rate of change at which the P regulator reacts to a change which is not covered by the I regulator is defined by the transfer function of the P regulator. If this transfer function reproduces the relationship between the third component of the on time and a change in the intermediate-circuit voltage, then the transfer function of the P regulator has at least one section with a predeterminable gradient. The control apparatus may be designed to vary this predeterminable gradient of the at least one section of the transfer function of the P regulator, e.g. as a function of a change or a rate of change in the intermediate-circuit voltage. Once the P regulator has become active, for example, the gradient of this at least one section of the transfer function of the P regulator can be slowly reduced, as a result of which the I regulator, which naturally has a long, that is to say slow, time constant, can gradually take over the component of the closed-loop control of the P regulator again.

The control apparatus may be designed to add the individual components of the on time. The I regulator accordingly covers the slow variations in the intermediate-circuit voltage caused by the mains frequency. The P regulator acts when, for example, a drop in the mains voltage results in a risk of the predeterminable value departing from the range of the intermediate-circuit voltage. In the event of extraordinary power demands on the load circuit, in contrast, the variation of the control signal at the switch for the voltage converter is active because of the power consumed in the discharge lamp. The interaction between these three measures for closed-loop control of the intermediate-circuit voltage makes it possible to reliably avoid undesirable operating points of the discharge lamp, while largely complying with the PFC condition.

In various embodiments, the voltage converter may represent a boost converter.

The various embodiments, which have been described with reference to the electronic ballast according to various embodiments, and their advantages apply in a corresponding manner, to the extent that they are applicable, to the method according to various embodiments.

FIG. 1 shows a schematic illustration of the time profile of the intermediate-circuit voltage $U_{ZW}$ for a known electronic ballast, see curve train a), and for an electronic ballast according to various embodiments, see curve train b). As can be seen, the intermediate-circuit voltage $U_{ZW}$ fluctuates about a nominal value $U_{ZWnom}$, because of the ripple resulting from the mains AC frequency. In various embodiments, it fluctuates between a minimum value $U_{ZWmin}$ and a maximum value $U_{ZWmax}$. At the time $t_Z$, a discharge lamp which is connected to the output of the electronic ballast is intended to be ignited. Because of the high power demand, the intermediate-circuit voltage $U_{ZW}$ in the case of the prior art, see curve train a), falls below the minimum permissible value $U_{ZWmin}$. This results in undesirable operating states, which can make ignition of the discharge lamp impossible, and can lead to the electronic ballast switching off. In contrast, in the case of an electronic ballast according to various embodiments, an increased power demand in the load circuit is registered at the time $t_Z$, and a closed-loop control process is started, which will be explained in even more detail with reference to FIG. 2. This makes it possible to reliably prevent the intermediate-circuit voltage $U_{UZ}$ from falling below the minimum permissible value $U_{ZWmin}$, see curve train b).

Figure 2:
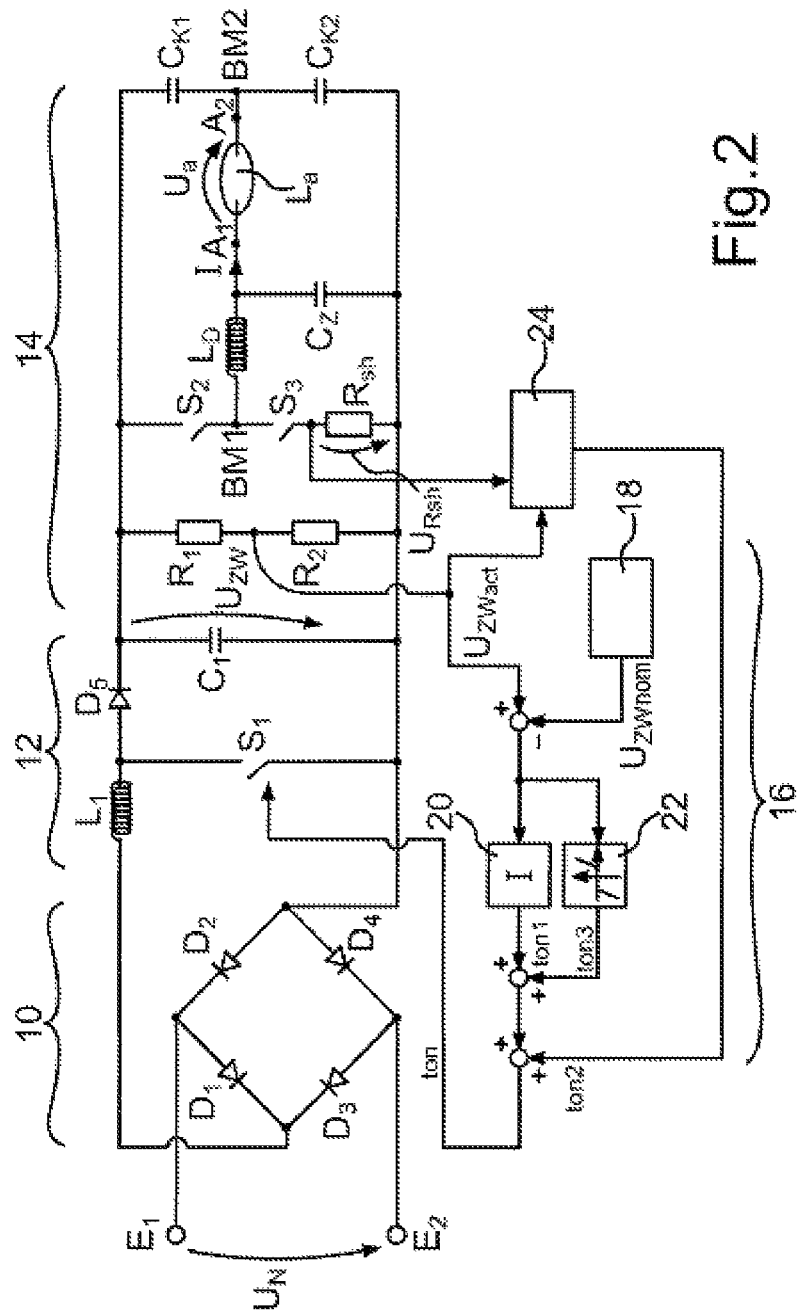
FIG. 2 shows a schematic illustration of an exemplary embodiment of an electronic ballast according to various embodiments.

FIG. 2 shows a schematic illustration of various embodiments of an electronic ballast. This includes an input having a first input connection E1 and a second input connection E2, between which an AC supply voltage $U_N$, e.g. a mains voltage, can be connected. The input of a rectifier 10, which includes the diodes D1 to D4, is coupled between the input connections E1, E2. An apparatus 12 for power factor correction is coupled to the output of the rectifier 10, in the present case a voltage converter, e.g. a boost converter. The boost converter itself includes an inductance L1, a diode D5 and a switch S1. The so-called intermediate-circuit voltage $U_{ZW}$ is produced on a load circuit 14 at the output of the apparatus 12 for power factor correction, across a capacitor C1 which, e.g. may be in the form of an electrolytic capacitor. In various embodiments, the load circuit 14 may include an inverter in the form of a half-bridge arrangement, with the half bridge including the switches S2, S3 as well as the coupling capacitors $C_{K1}$ and $C_{K2}$. A lamp inductor $L_D$ may be connected to the first half-bridge center point BM1, which represents the coupling point of the switches S2 and S3. The other connection of the lamp inductor $L_D$ is coupled to a first output connection A1. An ignition capacitor $C_Z$ for ignition of the discharge lamp is coupled between the output connection A1 and a reference potential, which in the present case represents the second output connection of the rectifier 10. A second output connection A2 of the electronic ballast is coupled to the second half-bridge center point BM2, which represents the coupling point between the coupling capacitors $C_{K1}$ and $C_{K2}$. A discharge lamp La is connected between the output connections A1, A2, which form the output of the electronic ballast.

A control apparatus 16 which, at its output, produces a control signal to the switch S1 in the apparatus 12 for power factor correction, will be explained in more detail in the following text. This control apparatus 16 includes a nominal-value production apparatus 18, which produces a nominal value $U_{ZWnom}$ for the intermediate-circuit voltage $U_{ZW}$. An actual value $U_{ZWact}$ of the intermediate-circuit voltage $U_{ZW}$ is obtained by means of a voltage divider R1, R2, with the voltage divider R1, R2 being connected in parallel with the capacitor C1. The difference between the actual value $U_{ZWact}$ and the nominal value $U_{ZWnom}$ of the intermediate-circuit voltage is fed on the one hand to an I regulator 20 and on the other hand to a P regulator 22. The I regulator has a time constant of about 20 to 50 ms and, at its output, produces a first component $t_{on1}$ of the on time $t_{on}$ of the control signal for the switch S1. This control signal is a square-wave signal, with the on time $t_{on}$ representing the time duration within one period of the square-wave signal, within which the switch S1 is switched on. The P regulator has two sections with a predeterminable gradient, as well as a flat center section. The schematically illustrated coordinate system shows the dependency of a further component $t_{on3}$ of the on time $t_{on}$ at the operating point $U_{ZWnom}$. The flat center section makes it possible to ensure that the normal closed-loop control of the intermediate-circuit voltage $U_{ZW}$ is carried out by the I regulator 20, while the P regulator 22 acts only when the fluctuation range is departed from because of the mains ripple, see FIG. 1. The P regulator has a time constant of 2 ms to 10 ms. The control apparatus 16 can be designed to vary the predeterminable gradient of the two sections of the transfer function of the P regulator, in particular as a function of a change or a rate of change in the intermediate-circuit voltage. This makes it possible for the I regulator 20 to once again gradually take over that component of the on time which in the meantime has been provided by the P regulator 22. This prevents impermissible fluctuations of the intermediate-circuit voltage $U_{ZW}$.

According to various embodiments, a further component $t_{on2}$ of the on time $t_{on}$ of the control signal can be provided for the switch S1 for the apparatus 12 for power factor correction. For this purpose, the power consumed in the load circuit 14, e.g. in the lamp La, is determined in a power determining apparatus 24. For this purpose, the power determining apparatus 24 is supplied with the voltage $U_{Rsh}$, dropped across a shunt resistor $R_{sh}$, which is arranged in series with the switches S2, S3 in the inverter. This voltage $U_{Rsh}$ is proportional to the current I which is produced at the discharge lamp La. Furthermore, the power determining apparatus 24 is coupled to the tap of the voltage divider R1, R2 for supplying a variable which is correlated with the actual value $U_{ZWact}$ of the intermediate-circuit voltage $U_{ZW}$. The power determining apparatus 24 uses these two voltages supplied to it to determine the power consumed in the load circuit 14, e.g. in the lamp La. Other possible ways to determine this power are well known by a person skilled in the art, and likewise carry out the same purpose. On the basis of this determined power, the power determining apparatus 24 uses a look-up table, in which the relationship between the determined power and the component $t_{on3}$ of the on time is stored, to produce the further component $t_{on3}$ of the on time $t_{on}$ of the control signal for the switch S1. This is added to the two other components $t_{on1}$ and $t_{on3}$, thus resulting in:

$$t_{on}=t_{on1}+t_{on2}+t_{on3}.$$

The production of the power-dependent component $t_{on2}$ of the on time $t_{on}$ allows the closed-loop control to react to sudden load changes even before the intermediate-circuit voltage $U_{ZW}$ collapses. The flat center section of the P regulator 22 accordingly allows the PFC condition to be complied with during normal operation of the electronic ballast. Only in exceptional situations, for example in the event of an extraordinary drop in the input voltage $U_N$, does the P regulator act, in order to regulate the intermediate-circuit voltage $U_{ZW}$ back to the nominal value $U_{ZWnom}$. However, the P regulator 22 on its own is unable to react to extraordinary power demands in the load circuit 14 since, if the power change takes place in the vicinity of the mains zero crossing, the P regulator 22 cannot recharge the capacitor C1. In contrast, because of the power-dependent component $t_{on2}$ of the on time $t_{on}$, the recharging of the capacitor C1 can be started as soon as increased power demand is recognized, as a result of which there is no need to wait for the intermediate-circuit voltage $U_{ZW}$ to fall below the minimum value $U_{ZWmin}$. This early reaction to power demands in the load circuit 14 makes it possible to reliably prevent the intermediate-circuit voltage $U_{ZW}$ from falling below the minimum value $U_{ZWmin}$. An electronic ballast according to the invention therefore does not assume any undesirable operating points.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic ballast for operation of at least one discharge lamp, the electronic ballast comprising:
    an input comprising a first input connection and a second input connection for coupling to an AC supply voltage;
    a rectifier comprising an input and an output, with the input of the rectifier being coupled to the first input connection and the second input connection;
    an apparatus for power factor correction comprising an input and an output, with the input of the apparatus for power factor correction being coupled to the output of the rectifier, and with the apparatus for power factor correction comprising a voltage converter having an inductance, a diode and a switch in which case an intermediate-circuit voltage can be produced at the output of the apparatus for power factor correction during operation of the electronic ballast;
    a load circuit comprising a first output connection and a second output connection for coupling to the at least one discharge lamp, with the load circuit being coupled to the output of the apparatus for power factor correction;
    a control apparatus comprising an I regulator with a nominal value input and an actual value input, with the nominal value input being coupled to a nominal-value production apparatus for production of a variable which is correlated with the nominal value of the intermediate-circuit voltage, with the actual value input being coupled to a node of the load circuit for production of a variable which is correlated with the actual value of the intermediate-circuit voltage, with the control apparatus being designed to produce at its output a control signal to the switch of the voltage converter, with the control signal being a square-wave signal, with the controlled variable of the I regulator representing a first component of the on time of the control signal, with the on time representing the time duration within one period of the square-wave signal, within which the switch in the voltage converter is switched on; and
    a P regulator connected in parallel with the I regulator;
    wherein the P regulator is configured to produce a third component of the on time of the control signal;
    wherein the transfer function of the P regulator, which reproduces the relationship between the third component of the on time and a change in the intermediate-circuit voltage, has at least one section with a predeterminable gradient; and
    wherein the electronic ballast furthermore comprises a power determining apparatus, which is designed to determine a variable which is correlated with the power consumed in the discharge lamp during operation of the at least one discharge lamp, with the power determining apparatus being coupled to the control apparatus, and with the control apparatus being designed to vary the control signal as a function of the power consumed in the discharge lamp.

2. The electronic ballast as claimed in claim 1,
    wherein the control apparatus is designed to produce a second component of the on time of the control signal as a function of the power consumed in the discharge lamp.

3. The electronic ballast as claimed in claim 2,
    wherein the control apparatus is designed to increase the second component of the on time when an increase is found in the power consumed in the at least one discharge lamp.

4. The electronic ballast as claimed in claim 1,
    wherein the time constant of the I regulator is greater than the time constant of the variation as a function of the power consumed in the at least one discharge lamp.

5. The electronic ballast as claimed in claim 1,
    wherein the time constant of the I regulator is greater by a multiple than the time constant of the variation as a function of the power consumed in the at least one discharge lamp.

6. The electronic ballast as claimed in claim 1,
    wherein the transfer function of the P regulator, which reflects the relationship between the third component and the on time and a change in the intermediate-circuit voltage, has a flat center section in the area of the zero crossing.

7. The electronic ballast as claimed in claim 1,
    wherein the control apparatus is designed to vary the predeterminable gradient of the at least one section of the transfer function of the P regulator.

8. The electronic ballast as claimed in claim 7,
    wherein the control apparatus is designed to vary the predeterminable gradient of the at least one section of the transfer function of the P regulator as a function of a change or a rate of change in the intermediate-circuit voltage.

9. The electronic ballast as claimed in claim 2,
    wherein the control apparatus is designed to add the individual components of the on time.

10. The electronic ballast as claimed in claim 1,
    wherein the voltage converter represents a boost converter.

11. An electronic ballast for operation of at least one discharge lamp, the electronic ballast comprising:
    an input comprising a first input connection and a second input connection for coupling to an AC supply voltage;
    a rectifier comprising an input and an output, with the input of the rectifier being coupled to the first input connection and the second input connection;
    an apparatus for power factor correction comprising an input and an output, with the input of the apparatus for power factor correction being coupled to the output of the rectifier, and with the apparatus for power factor correction comprising a voltage converter having an inductance, a diode and a switch in which case an intermediate-circuit voltage can be produced at the output of the apparatus for power factor correction during operation of the electronic ballast;
    a load circuit comprising a first output connection and a second output connection for coupling to the at least one discharge lamp, with the load circuit being coupled to the output of the apparatus for power factor correction;

a control apparatus comprising an I regulator with a nominal value input and an actual value input, with the nominal value input being coupled to a nominal-value production apparatus for production of a variable which is correlated with the nominal value of the intermediate-circuit voltage, with the actual value input being coupled to a node of the load circuit for production of a variable which is correlated with the actual value of the intermediate-circuit voltage, with the control apparatus being designed to produce at its output a control signal to the switch of the voltage converter, with the control signal being a square-wave signal, with the controlled variable of the I regulator representing a first component of the on time of the control signal, with the on time representing the time duration within one period of the square-wave signal, within which the switch in the voltage converter is switched on; and a P regulator connected in parallel with the I regulator;
wherein the P regulator is configured to produce a third component of the on time of the control signal;
wherein the transfer function of the P regulator, which reflects the relationship between the third component and the on time and a change in the intermediate-circuit voltage, has a flat center section in the area of the zero crossing wherein the electronic ballast furthermore comprises a power determining apparatus, which is designed to determine a variable which is correlated with the power consumed in the discharge lamp during operation of the at least one discharge lamp, with the power determining apparatus being coupled to the control apparatus, and with the control apparatus being designed to vary the control signal as a function of the power consumed in the discharge lamp.

* * * * *